Patented July 15, 1952

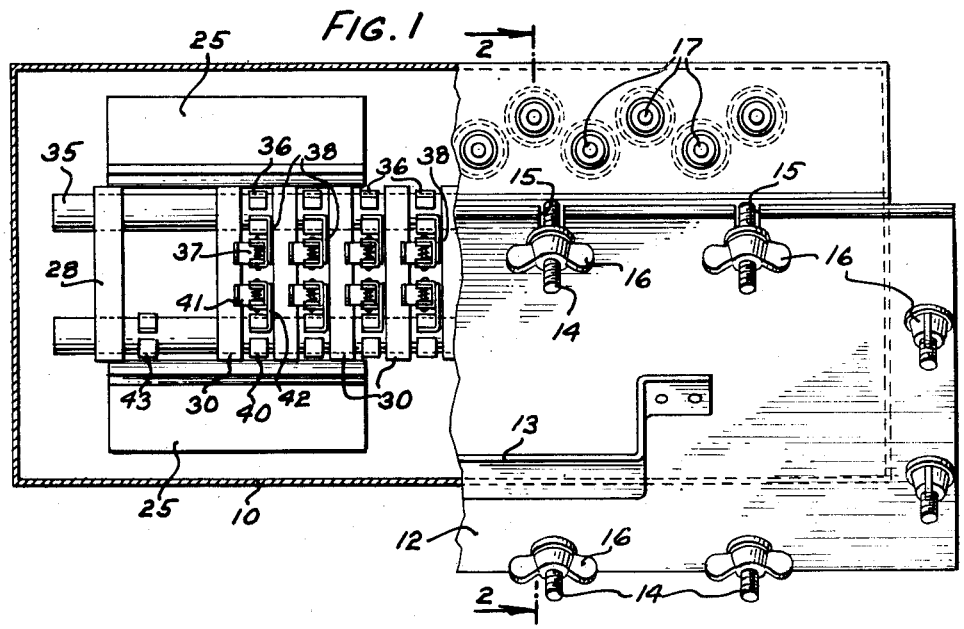
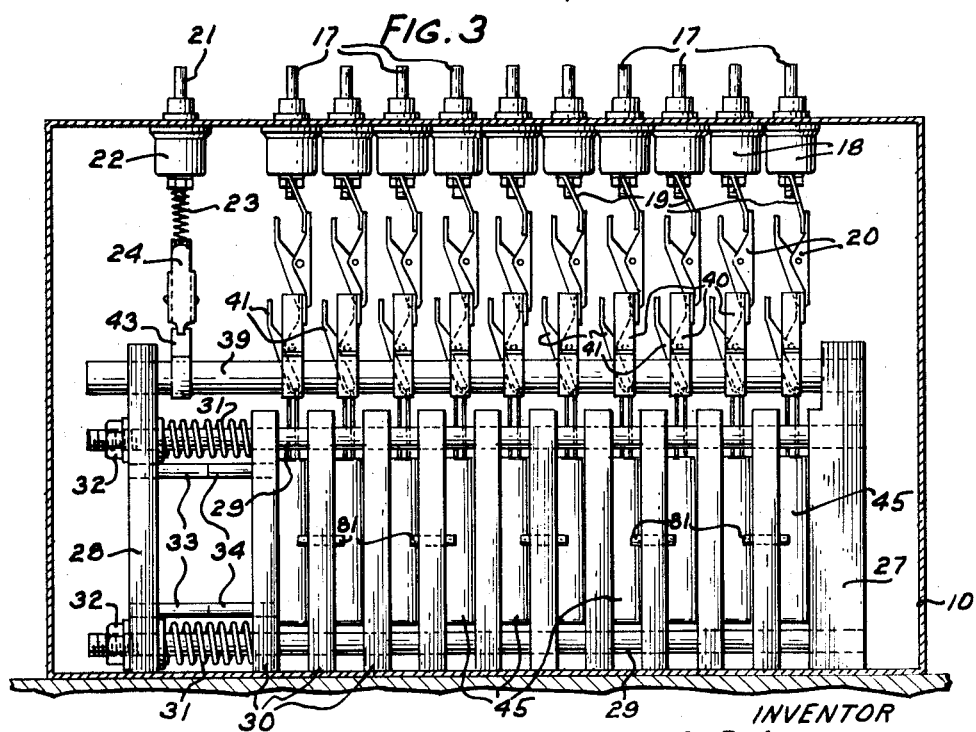

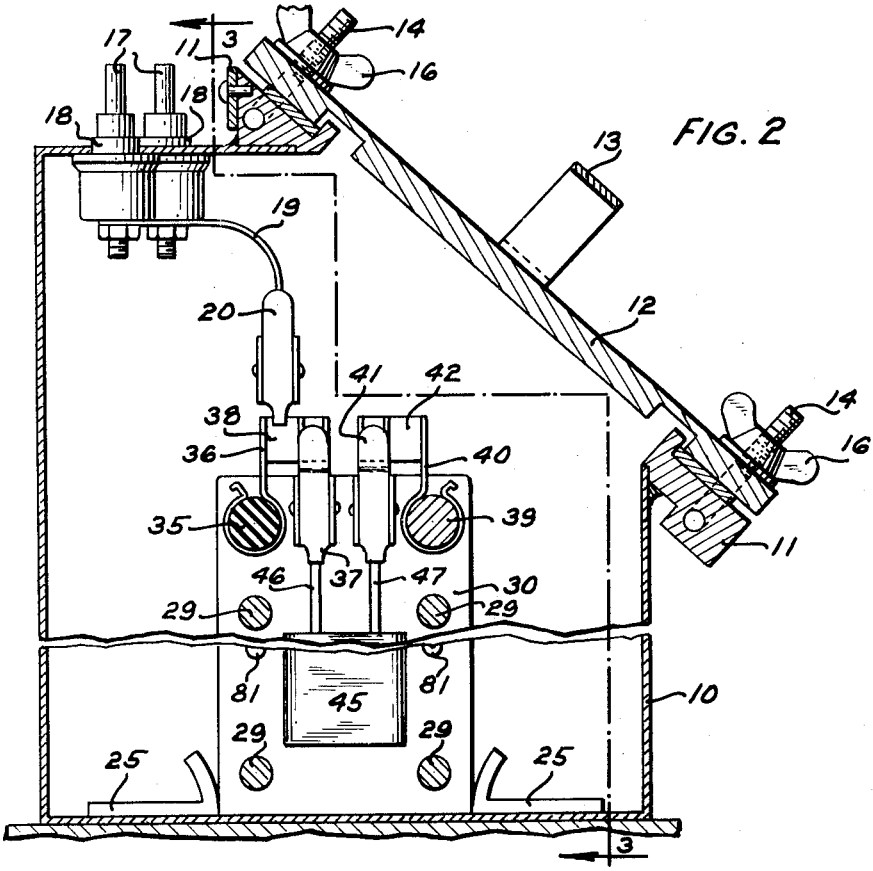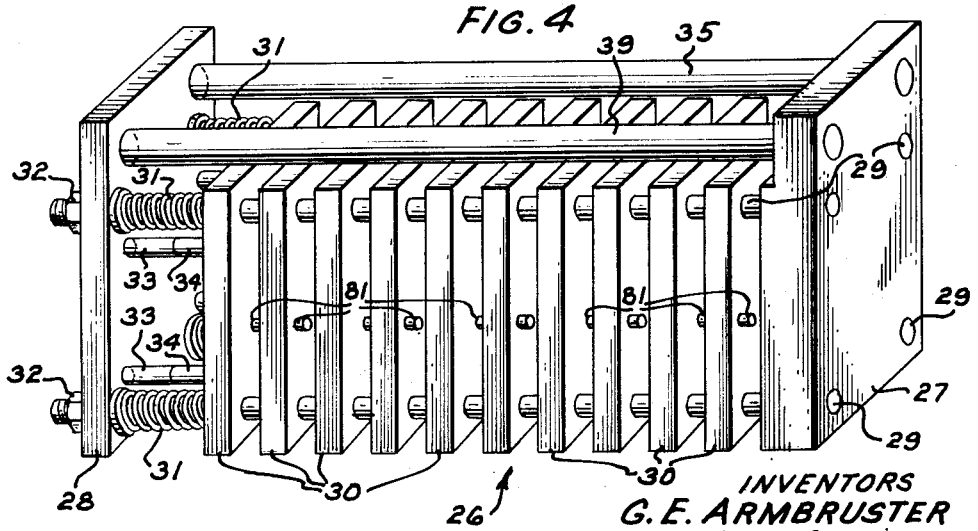

2,603,683

UNITED STATES PATENT OFFICE 2,603,683

ELECTRICAL TEST EQUIPMENT

Gordon E. Armbruster, Oak Park, and Charles C. Cole, Western Springs, Ill., assignors to Western Electric Company, Incorporated, New York, N. Y., a corporation of New York Application September 10, 1949, Serial No. 115,064

4 Claims. (Cl. 174—59)

This invention relates to electrical testing equipment and more particularly to a receptacle and jig for holding articles while subjecting them to electrical tests.

In the manufacture of many electrical articles it is common practice to use a good grade of paper interleaved between various electrical conductors in the article in such a manner that the paper serves as an insulator. In the manufacture of condensers, for example, it is customary to wind alternate layers of paper and foil, the paper serving as an insulator between the layers of foil. In order to insure that the paper being used in the manufacture of condensers is of high quality and will perform satisfactorily, it has been found desirable to take a sample of the paper being used, wind it into a condenser of specified dimensions, and subject the condenser to what is known in the art as an accelerated life test. This test involves the application of test potentials to the condensers while they are subjected to a high temperature. However, it is not believed to be necessary to go into any further detail since the present invention is not concerned with the method of testing but rather with a specific and novel type of receptacle and jig for use in testing electrical apparatus.

It is an object of the invention to provide a novel receptacle and jig for holding electrical articles while subjecting them to electrical tests.

It is another object of the invention to provide a receptacle having an opening therein arranged in such a manner that the operator may insert and remove the jig and complete the various electrical connections with a minimum of effort and with greater efficiency.

In accordance with one embodiment of the invention a receptacle of substantially rectangular cross section has an opening in the top thereof, the plane of which is oblique to the plane of the bottom of the receptacle. The sloped opening extends through the top and three lateral sides of the receptacle to provide a much more convenient opening through which a jig may be inserted into the receptacle. The jig consists of a plurality of plates having sandwiched therebetween a plurality of articles to be tested, and the jig further contains means for making easy and positive electrical connections from each of the articles under test to a source of test voltage, the connections being made through terminals extending through the top of the receptacle adjacent the opening therein.

A complete understanding of the invention may be had by referring to the following description when taken in conjunction with the accompanying drawings, wherein Fig. 1 is a top plan view of the receptacle having a jig placed therein;

Fig. 2 is a vertical sectional view on an enlarged scale taken along line 2—2 of Fig. 1;

Fig. 3 is a vertical sectional view of the receptacle and jig taken along lines 3—3 of Fig. 2; and Fig. 4 is an isometric view of the jig.

Referring now to the drawings and more particularly to Figs. 1, 2 and 3, a metallic receptacle 10 of substantially rectangular cross section has a sloping opening formed therein, which opening is on a plane extending through the top and three lateral sides of the receptacle 10. The opening is surrounded by a flange 11 which is welded to the receptacle 10 and which serves to receive a metallic cover 12 having a handle 13 thereon to facilitate its handling. The cover 12 is adapted to be secured to the flange 11 by means of hinged screws 14 which have their bases hingedly secured in the flange 11 and which are movable in slots 15 formed in the cover 12. The screws 14 have threads formed on the outer ends thereof to receive wing nuts 16 which serve to tighten the cover 12 in pressure-tight engagement with the flange 11. A plurality of electrical terminals 17 extend through the top of the receptacle 10 adjacent that portion of the flange 11 which extends along the top of the receptacle, and these terminals 17 are insulated from the receptacle 10 by means of insulating members 18 which surround the electrical terminals 17. Each of the electrical terminals 17 has appended thereto a spring type conductor 19 which is in turn electrically connected to a small spring clip 20. In addition to the terminals 17 extending through the top of the receptacle 10, a common terminal 21 is provided which also extends through the top of the receptacle 10 adjacent the flange 11. The terminal 21 is likewise insulated from the receptacle 10 by means of an insulating member 22 and terminal 21 has appended thereto, on the inner end thereof, a coil spring type conductor 23 which is likewise electrically connected to a small spring clip 24.

The receptacle 10 has secured in the bottom thereof guide members 25 which serve to position a jig 26 which is shown in detail in Fig. 4. The jig consists of a pair of end plates 27 and 28. The plate 27 has permanently mounted therein four metallic rods 29, which rods serve to slidably support a plurality of metallic spacer plates 30. The spacer plates 30 have alternately placed thereon small projections 81, the purposes of which are to maintain the spacer plates 30 spaced apart when no articles to be tested are placed therebetween and to aid in retaining the articles to be tested in their proper positions between the plates. The spacer plates 30 having articles placed therebetween are adapted to be placed under a constant pressure by means of the end plate 28 and a plurality of coil springs 31 which surround the rods 29. The end plate 28 is slidably mounted on the rods 29 which have threaded ends to receive four nuts 32 which serve to tighten the end plate 28 against the spring 31. The ends of the springs 31 opposite the ends adjacent the end plate 28 abut the spacer plate 30 nearest the end plate 28 to exert pressure on the spacer plates 30 and the articles therebetween. The end plate 28 also carries a plurality of projections 33 which are adapted to come in contact with similar projections 34 carried by the spacer plate 30 nearest the end plate 28. These pairs of projections 33—34 when in abutting relationship serve to indicate that a predetermined pressure is being applied on the articles carried between the spacer plates 30. The end plate 27 also has a rod 35 fixedly mounted therein, which rod is of a suitable insulating material such as glass. The rod 35 has spaced along its length a plurality of resilient clips 36 which have formed integral therewith small spring clips 37 similar to the small spring clips 20. The resilient clip 36 is connected to the small spring clip 37 by means of a flat section 38, which section is adapted to be contacted by one of the small spring clips 20. The end plate 27 also has fixedly mounted therein an electrical conducting rod 39, which also has spaced along the length thereof a plurality of resilient clips 40 similar to the resilient clips 36. The resilient clips 40 have formed integral therewith small spring clips 41, which are connected to the resilient clips 40 by a flat section 42. The conducting rod 39 also carries a single resilient clip 43, which is adapted to be connected to the terminal 21 by means of the small spring clip 24. The rods 35 and 39 are supported at their other ends by the end plate 28, in which they are slidably mounted.

In the operation of the device, assuming that a plurality of condensers 45 having electrodes 46 and 47 are to be tested, the empty jig 26 is placed on end with the end plate 28, the nuts 32 and the springs 81 removed from the assembly. With the jig resting in a vertical position on the end plate 27, a condenser 45 to be tested is placed between the end plate 27 and the first spacer plate 30. One of the small spring clips 37 is then clipped to the electrode 46 of the condenser under test, and one of the small spring clips 41 is connected to the other electrode 47 of the condenser under test. This procedure is carried out for each condenser until a condenser has been placed in position between each pair of spacer plates 30. At this time, the four coil springs 31 are replaced around the rods 29, and the end plate 28 is returned to its position. The nuts 32 are then tightened to force the end plate 28 and the springs 31 to the right (Fig. 4). The nuts are tightened until the projections 33 abut the projections 34, at which time a predetermined constant pressure is applied to the condensers 45 under test. The jig assembly 26, with the condensers to be tested, is then inserted through the opening in the receptacle 10 and is placed between the guides 25 in the bottom of the receptacle 10. At this time, each of the small spring clips 20 is clipped to one of the surface sections 38 to complete an electrical circuit from one of the terminals 17 to one side of one of the condensers 45 through one of the electrodes 46. Small spring clip 24 is then clipped to resilient clip 43 on the conducting rod 39 to complete an electrical circuit from electrical terminal 21 to the electrode 47 of each of the condensers 45 under test. The lid 12 is then placed over the opening and in register with the flange 11, after which the bolts 14 and wing nuts 16 are swung into position and tightened to complete the loading operation. The receptacle 10 and jig 26 may then be placed in an oven for the desired tests.

It is to be noted that although such has not been mentioned, it is the usual practice to impregnate the complete assembly prior to replacing the cover 12 on the receptacle 10 after the jig has been placed therein. With an arrangement such as that disclosed herein, the problem of making electrical connection to each of the articles under test is greatly facilitated. In prior devices, use has been made of terminals extending through the cover of the receptacle, the cover being in a horizontal position when placed on the receptacle. With such an arrangement, it was necessary to provide the terminals extending through the cover with coil spring type appendages for connection to the electrodes of the articles under test. Such an arrangement proved undesirable because the coil springs had a tendency to stretch, whereupon, when the cover was replaced on the old type receptacle, the springs tended to bend and cause short circuits across various springs.

Another arrangement which has been used consists of extending the terminals through the side of the receptacle. Such an arrangement often results in the terminals being damaged as the receptacle is moved or stored. Furthermore, great difficulty is experienced in making electrical contact to the outer extensions of the terminals after the receptacle is placed in the testing oven. With an arrangement such as disclosed herein, the coil spring type conductors have been eliminated and the resilient conductors substituted therefor. Furthermore, the receptacle has been provided with an opening which still permits the terminals to extend through the top of the receptacle without extending through the cover thereof. As pointed out before, such positioning of the terminals facilitates handling of the receptacle and also facilitates connection of the exterior electrical connections to the terminals, particularly when the exterior connections are appended from the top interior of an oven, or the like.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An electrical test device comprising in combination a receptacle of rectangular cross-section and having a sloped opening therein on a plane extending through a part of the top and three lateral sides of the receptacle, a lid for said opening, means for securing said lid over said opening, a plurality of electrical terminals extending through the top of said receptacle adjacent said opening, guide means disposed on the bottom interior of said receptacle, a removable jig cooperating with said guide means, said jig comprising a plurality of spring-pressed plates adapted to receive therebetween articles to be tested, means for maintaining a predetermined pressure on said articles, an electrically conducting bar carried by said jig and having disposed along its length a plurality of electrically conducting clips adapted to be connected to one electrical terminal of each of the articles under test, a non-conducting rod carried by said jig and having disposed along its length a plurality of electrically conducting clips adapted to be connected to the other electrical terminal of each of the articles under test, a plurality of spring mounted clips connected to the interior extensions of said first-mentioned electrical terminals and adapted to be connected to the clips on said non-conducting rod, a common terminal extending through said top and having connected thereto a clip for electrical connection to said conducting rod, whereby each article under test may be connected to a separate test voltage.

2. Electrical test equipment including, in combination, a plurality of cooperating spring-pressed plates adapted to receive therebetween a plurality of articles to be tested, a framework for carrying said plates, a conducting bar carried by said framework, a plurality of electrically conducting clips slidably attached to said conducting bar and adapted to be connected to one of the terminals of each of the articles under test, a non-conducting bar carried by said framework, a plurality of conducting clips slidably attached to said non-conducting bar and adapted to be connected to a second terminal of each of the articles under test, means enclosing the complete aforementioned assembly, and means for impressing a separate test voltage between each of the clips on said non-conducting bar and the conducting bar.

3. A device for holding condensers under test comprising a plurality of supporting rods, a plurality of spaced-apart plates slidably mounted on the rods and adapted to receive therebetween condensers to be tested, means for maintaining a predetermined pressure on said plates and condensers, a non-conducting rod, a plurality of electrically conducting clips mounted thereon and adapted to be connected to one of the electrodes on each of said condensers, a common connection to the other electrode of each of the condensers, and pressure-tight means for enclosing the complete assembly.

4. An electrical test device comprising, in combination, a receptacle of rectangular cross-section and having a sloped opening therein on a plane extending through a part of the top and three lateral sides of the receptacle, a removable cover for said opening, a plurality of electrical terminals extending through the top of said receptacle adjacent said opening and insulated from said receptacle, a removable jig adapted to be placed in said receptacle comprising a plurality of plates adapted to receive therebetween a plurality of articles to be tested, means for maintaining a constant predetermined pressure on said articles and plates, an electrically conducting bar carried by said jig and having disposed along its length a plurality of slidably mounted electrically conducting clips connectible to one electrical terminal of each of the articles under test, an insulating rod carried by said jig and having slidably mounted along its length a plurality of electrically conducting clips connectible to the other electrical terminal of each of the articles under test, a plurality of spring-mounted clips appended to the interior extensions of said first-mentioned electrical terminals and connectible to the respective clips carried by said insulating rod, and a common terminal extending through said top and having appended on the interior extension thereof a clip electrically connectible to said conducting rod, whereby each article under test may be connected to a separate test voltage.

GORDON E. ARMBRUSTER.
CHARLES C. COLE.

REFERENCES CITED

The following references are of record in the file of this patent:

UNITED STATES PATENTS

| Number | Name | Date |
|---|---|---|
| 1,156,583 | Bissell et al. | Oct. 12, 1915 |
| 1,686,674 | Larsen | Oct. 9, 1928 |
| 1,904,876 | Park, Jr. | Apr. 18, 1933 |
| 2,126,674 | Stout | Aug. 9, 1938 |
| 2,293,485 | Baldwin | Aug. 18, 1942 |
| 2,414,437 | Betzler | Jan. 21, 1947 |
| 2,438,371 | Marholz | Mar. 23, 1948 |
| 2,467,727 | Brown | Apr. 19, 1949 |

FOREIGN PATENTS

| Number | Country | Date |
|---|---|---|
| 443,674 | France | Sept. 30, 1912 |

OTHER REFERENCES

Electrical World, vol. 77, No. 22, May 28, 1921, page 255.